US012606228B2

(12) United States Patent
Zonzini et al.

(10) Patent No.: US 12,606,228 B2
(45) Date of Patent: Apr. 21, 2026

(54) SELF-PROPELLED STAIR CLIMBER

(71) Applicants: Claudio Zonzini, Casaleone (IT);
Jacopo Zonzini, Casaleone (IT);
Arianna Zonzini, Cerea (IT); **Laura
Zonzini**, Cerea (IT)

(72) Inventors: Claudio Zonzini, Casaleone (IT);
Jacopo Zonzini, Casaleone (IT);
Arianna Zonzini, Cerea (IT); **Laura
Zonzini**, Cerea (IT)

( * ) Notice: Subject to any disclaimer, the term of this
patent is extended or adjusted under 35
U.S.C. 154(b) by 644 days.

(21) Appl. No.: 18/010,439

(22) PCT Filed: Jun. 22, 2021

(86) PCT No.: PCT/IB2021/055500
§ 371 (c)(1),
(2) Date: Dec. 14, 2022

(87) PCT Pub. No.: WO2021/260547
PCT Pub. Date: Dec. 30, 2021

(65) Prior Publication Data
US 2023/0227089 A1    Jul. 20, 2023

(30) Foreign Application Priority Data

Jun. 25, 2020    (IT) ........................ 102020000015391

(51) Int. Cl.
B62B 5/02        (2006.01)
B62B 5/00        (2006.01)
(52) U.S. Cl.
CPC ........... B62B 5/025 (2013.01); B62B 5/0033
(2013.01); B62B 5/023 (2013.01); *B62B
2301/08* (2013.01); *B62B 2301/256* (2013.01)
(58) Field of Classification Search
CPC ........ B62B 5/025; B62B 5/0033; B62B 5/023
(Continued)

(56) References Cited

U.S. PATENT DOCUMENTS 5,248,007 A  *  9/1993  Watkins ................. A61G 5/061
                                                    701/1
6,484,829 B1 * 11/2002  Cox ..................... B62D 57/028
                                                    180/8.1
(Continued)

FOREIGN PATENT DOCUMENTS

CN        110464561 A  * 11/2019  ........... A61G 5/1051
EP        0345803 A2    12/1989
(Continued)

OTHER PUBLICATIONS

Merged original with english translation; Paragraphs added for
citation purposes (JP 2006248309). (Year: 2025).*
(Continued)

*Primary Examiner* — Valentin Neacsu
*Assistant Examiner* — Nathaniel William Watkins
(74) *Attorney, Agent, or Firm* — Carmel Patent Agency;
Robert Ballarini

(57)        ABSTRACT

A self-propelled goods stair climber includes: first and
second motorized tracks and an elongated configuration
parallel to a straight forward travel direction; a loading
surface implemented to tilt with respect to the tracks around
a first transverse axis perpendicular to the tracks; an actuated
stabilization member movable between an extracted position
so that the weight of the stair climber is carried at least in
part by the stabilization member and a retracted position in
which the stabilization member is not loaded; a proximity or
support sensor carried by the stabilization member to send a
signal of approach or contact with a floor; an electronic
control unit programmed to activate the first and second
tracks on the basis of said signal when the stabilization
member is extracted; and check an inclination of the loading
surface to be maintained in a predefined angular range with
respect to a horizontal direction.

20 Claims, 15 Drawing Sheets

(58) Field of Classification Search
    USPC ...................................................... 280/5.22
    See application file for complete search history.

(56)                      References Cited

U.S. PATENT DOCUMENTS

| | | | |
|---|---|---|---|
| 2002/0104692 A1* | 8/2002 | Nakatsukasa .......... | A61G 5/061 |
| | | | 180/8.3 |
| 2003/0121705 A1* | 7/2003 | Rau ...................... | B62D 55/075 |
| | | | 180/9.1 |
| 2003/0183428 A1* | 10/2003 | Hedeen ............... | B62D 55/075 |
| | | | 280/5.22 |
| 2006/0037789 A1* | 2/2006 | Kritman ................ | A61G 5/061 |
| | | | 280/5.22 |
| 2006/0124366 A1 | 6/2006 | Le Masne De Chermont | |
| 2007/0182220 A1 | 8/2007 | Walkinshaw | |
| 2016/0362147 A1* | 12/2016 | Mailey ................... | A61G 5/061 |
| 2019/0350782 A1* | 11/2019 | Wang .................... | B62D 55/04 |

FOREIGN PATENT DOCUMENTS

| | | | | | |
|---|---|---|---|---|---|
| EP | 3670294 A1 | * | 6/2020 | .......... | B62B 5/0404 |
| FR | 2610885 A1 | | 8/1988 | | |
| JP | 2006248309 A | * | 9/2006 | | |

OTHER PUBLICATIONS

Merged original with english translation; Paragraphs added for citation purposes (WO 2015019982). (Year: 2025).*

* cited by examiner

100

4

6

7

101; 102

103

4

6

7

SELF-PROPELLED STAIR CLIMBER

FIELD OF TECHNIQUE

The present invention refers to a high performance stair climber. More particularly, the present invention refers to a trolley-type stair climber for the transport of at least one load and/or people and can be used both for climbing stairs, ramps or other inclined paths, as well as on substantially flat paths.

STATE OF THE ART

Motorized stair climbers are known for transporting goods both in bulk, for example in a construction site, and packed, for example boxes containing various types of items, to be transported along flights of stairs, in particular in the absence of a lift or freight elevator. For example, the load to be transported, with or without packaging, can include vending machines, photocopiers, motors and components of lifts, stoves, fireplaces, boilers, machinery and in general various materials, including construction materials. Currently, there is an increasing need to increase the level of automation of the known motorized stair climbers and, at the same time, to ensure high levels of safety, in particular to avoid their overturning.

Furthermore, it is important that the overall dimensions of the stair climber are compact and, in particular, that the center of gravity of the stair climber is as low as possible, in order to make tipping more difficult, thus allowing to properly safeguard goods and/or safety. of an operator or an individual who passes in the vicinity of the stair climber when it is in action.

US2006/124366 discloses a motorized vehicle which is provided with two tracks, as well as with a pair of front wheels and a pair of rear wheels. In particular, the pair of rear wheels is driving and is mounted on an oscillating arm operated by an actuator so that the rear wheels can assume two conditions: a first condition in which the movement of the vehicle is carried out by the wheels alone, and a second condition in which the movement of the vehicle is carried out by the tracks in combination with the pair of rear drive wheels. US2003/121705 discloses a motorized vehicle with a chassis, on which a seat is mounted, and which is provided with a pair of parallel tracks. Furthermore, in correspondence with the rear area of the vehicle, a retractable stabilization arm is mounted, at the end of which an idle wheel is mounted, to prevent the vehicle from overturning during the climb phase. Furthermore, between the tracks, a lifting arm is mounted which is operated by a hydraulic cylinder and which has one end articulated to the frame while a support base is mounted at the other free end; in particular, when the lifting arm is activated, the support base protrudes below the tracks and comes into contact with the landing or with the end of the steps of a flight of stairs so as to raise the rear area of the entire vehicle with respect to the support base.

OBJECTS OF THE INVENTION

The object of the present invention is to propose a stair climber which allows to satisfy, at least in part, the above requirements.

Another object of the present invention is to propose a stair climber which allows to overcome, at least in part, the drawbacks and operating limits of traditional solutions.

Another object of the present invention is to propose a stair climber that can be used by a single operator and in extreme safety both during the climb of the stairs and during the descent.

Another object of the present invention is to propose stair climbers which maintain the handling characteristics of known stair climbers during movement on flat, horizontal and not sloping surfaces.

Another object of the present invention is to propose a stair climber which allows the safe and stable handling of the loads transported during the ascent and descent of the stair or of the inclined plane in general.

Another object of the present invention is to propose a stair climber that is simple to build and cheap to make, easy to maintain, light to transport and of reduced bulk without load.

Another object of the present invention is to propose a stair climber which is reliable and resistant over time.

Another object of the present invention is to propose a stair climber which can be manufactured simply, quickly and at low costs.

Another object of the present invention is to propose a stair climber with a low weight and easy to transport.

Another object of the present invention is to propose a stair climber which is an alternative and/or an improvement with respect to traditional solutions.

Another object of the present invention is to propose a stair climber that has an alternative and/or improved configuration, both in terms of construction and in functional terms, with respect to traditional solutions.

All these purposes, both individually and in any combination thereof, and others that will result from the following description, are achieved, according to the invention, with a stair climber having the features indicated in claim 1.

In particular, the self-propelled stair climber according to the invention includes:

A first and second motorized tracks having an elongated configuration parallel to a straight forward travel direction of the stair climber;

A loading surface implemented to tilt with respect to the tracks around a first transverse axis, preferably perpendicular to the tracks;

A stabilization member, e.g. comprising an arm, implemented for movable stabilization between an extracted position so that the weight of the stair climber is carried at least in part by the arm resting on a pavement and a retracted position in which the stabilization arm is not loaded by the weight of the stair climber A proximity or support sensor carried by the arm actuated to send a signal of approach or contact with the pavement A control unit programmed for:

activate the first and second tracks on the basis of said signal when the stabilization arm is extracted;

check an inclination of the loading surface so that the inclination is maintained in a predefined angular range with respect to a horizontal direction.

Advantageously, in a possible embodiment, the stair climber according to this configuration, especially through the stabilization member which advantageously comprises at least one stabilization arm, and the proximity or support sensor, can implement automatic and intelligent functions, to thus help a operator for example when an ascent ends or a descent begins.

Preferably, the proximity or support sensor, when the stabilization arm is in the extracted position, follows the flooring of the path along which the stair climber moves and this flooring can be both indoor environments (and therefore include tiles of various natural materials or artificial and/or concrete slabs or similar) and open places (and include dirt roads or not protected by gravel and/or a layer of asphalt and the like). Non-limiting examples of contact or proximity sensors are simple switches, optical, inductive, capacitive, magnetic or ultrasonic sensors.

According to a preferred embodiment of the present invention, the electronic control unit is programmed in an end climb mode so that, while the first and second tracks are driven to ascend, the stabilization arm is progressively—in continuous and/or step mode—extracted on the basis of a signal of said proximity or support sensor, representative of a contact between the stabilization arm and the pavement or of a signal representative of a distance less than a predefined threshold between the stabilization arm and the flooring. In this way, the stabilization arm is kept close to or in contact with the pavement while the stair climber continues to advance on the ascent or flight of stairs and this contributes substantially to increasing the stability of the stair climber in the transitional complex defined by the end of an inclined path. like a flight of stairs. In fact, the stabilization arm is already in proximity to or in contact with the pavement when the tracks move back from the inclined path because the movement of the center of gravity has caused the weight to be shifted on the stabilization arm in the extracted position. In fact, the stabilization arm defines a support on which, when the tracks are raised at the rear, a progressively increasing part of the weight of the stair climber can be loaded. Conveniently, through the presence of an inertial sensor, for example an inertial platform or one or more accelerometers, on the loading surface, the control unit is programmed to adjust the position of the loading surface while the stabilization arm is progressively loaded. and the tracks are only partially in contact with the ascent of the ladder. In this condition, in fact, the frame undergoes a variation of angular position with respect to the horizontal direction caused by the advancement of the tracks. The position of the loading surface must be modified by compensating, i.e. contrasting this variation in the angular position of the frame to keep the load in a sufficiently stable position, i.e. sufficiently close to the horizontal. This compensation can be synchronized with the movement of the tracks or it can be sequential, i.e. the tracks advance by a predefined amount, stop and the loading floor rotates towards the horizontal direction and so on.

Conveniently, the detection of the landing can be carried out substantially automatically using sensors or manually by the user (or an operator) by entering a command on the user interface.

Advantageously, the end-of-climb procedure can be started or manually, for example via a remote control, when the operator sees that it is possible to extract the stabilization arm while the tracks are still in stable contact with the inclined path. Otherwise, a suitable sensor—e.g. an optical sensor such as a camera or a proximity or support sensor, in which "proximity" is intended as a measure of a distance, e.g. ultrasound, radar etc.—is set up on board the stair climber to detect the end of the climb, i.e. the absence of obstacles, and allow the electronic control unit, after processing the signal generated by the sensor and/or other obstacle detector, to automatically start the end-of-climb procedure. This makes it possible to automate the operation of the stair climber during the transport of the load and increase comfort and safety when, according to a non-limiting example, the loading floor carries a wheelchair for the disabled, who can thus climb the stairs facing the ascent.

According to a preferred embodiment of the present invention, the control unit is programmed in a descent start mode in such a way that the stabilization arm is extracted to lift the portion of the tracks which is further away than the one proximal to the area of start of descent; the tracks are then operated to descend the ladder and the stabilization arm is brought into retracted position after a no-contact signal (in particular with the starting landing) or a signal representative of a distance between the arm is generated by the sensor of stabilization and the flooring (in particular of the starting landing) higher than a predetermined threshold. Preferably, synchronized with the movement of the stabilization arm or in a preparatory phase prior to the inclination of the tracks, the inclination of the loading surface is modified by means of the control unit and suitable actuators in order to maintain the load in a position suitable for descent., eg horizontal or inclined towards the rear to move the center of gravity and therefore the weight of the stair climber towards the stabilization arm.

In this way, the tracks are pre-inclined before advancing on the descent and this makes the transient more fluid, especially in the case in which the variation in slope is high and localized in an edge, as happens for example in a flight of stairs. Also in this case, the electronic control unit, through the inertial sensor, controls the angular position of the loading surface in a synchronous or sequential way with the drive motor of the tracks in order to keep the load stable in a predefined position. Conveniently, the descent start procedure is either started manually by the operator e.g. via the remote control or via a special sensor such as that of the end of ascent procedure, e.g. an optical sensor and/or a proximity or support sensor capable of detecting the beginning of the descent or the change of slope before the stair climber travels this descent or advances on the new slope. According to a first embodiment, the extraction position of the stabilization arm is such that the tracks reach a predefined inclined position to have an angle less than or equal to the slope as per standard of a ladder, such as, for example, for Italy, 75° so that the advancement of the tracks makes it possible to overcome an edge of the first step of the descent and reach an edge of the second step of descent with a relatively small or negligible change in the inclination of the tracks themselves. During this movement, the pre-defined position of the loading floor is such as to ensure that a center of gravity of the stair climber with the load is positioned so that most of the weight is carried by the stabilization arm. According to this embodiment, the track motor includes a speed sensor, for example an angular encoder, or other sensor configured to measure the advancement of the stair climber towards the second step. After detecting sufficient progress, e.g. higher than a pre-determined threshold and calculated so that the tracks rest on the edges of the first and second step, commands the retraction of the stabilization arm so that the tracks can continue along the descent.

Alternatively, the stair climber can include second inertial sensors to measure the inclination of the tracks and this measurement is compared to the measurement of the loading surface to establish the retraction condition of the stabilization arm. For example, the stabilization arm is retracted when the load surface inclination sensor and the track sensor measure constant angles to each other for a predetermined time while the stair climber advances along the descent: this condition is in fact verified when the tracks rest on the edges of two adjacent steps.

According to a preferred embodiment of the present invention, the stair climber comprises a hollow support structure to which the loading surface is hinged and connected to the first and second tracks, in which a first actuator for controlling the inclination of the loading surface is housed. and a second actuator for controlling the stabilization arm.

In this way the actuators, preferably but not exclusively linear and preferably electrically powered, are housed in a compact manner, e.g. side by side, in their respective retracted configuration and this allows to keep the center of gravity of the stair climber particularly low.

Furthermore, in the retracted configuration, the two actuators are advantageously substantially parallel and preferably housed in a volume which remains defined between the tracks, making the stair climber in question particularly compact. Other advantages and technical characteristics will become evident from the description of the invention that follows and in particular from the dependent claims which form an integral part of this description.

BRIEF DESCRIPTION OF THE FIGURES

The present invention is further described hereinafter in some of its preferred embodiments, given purely by way of non-limiting example with reference to the attached drawings, in which:

FIG. 5a is a plan view of the stair climber of the present invention with the loading surface inclined—FIG. 5b is a cross section according to the plane A-A of FIG. 7a;

DETAILED DESCRIPTION OF THE INVENTION

Figure 1:
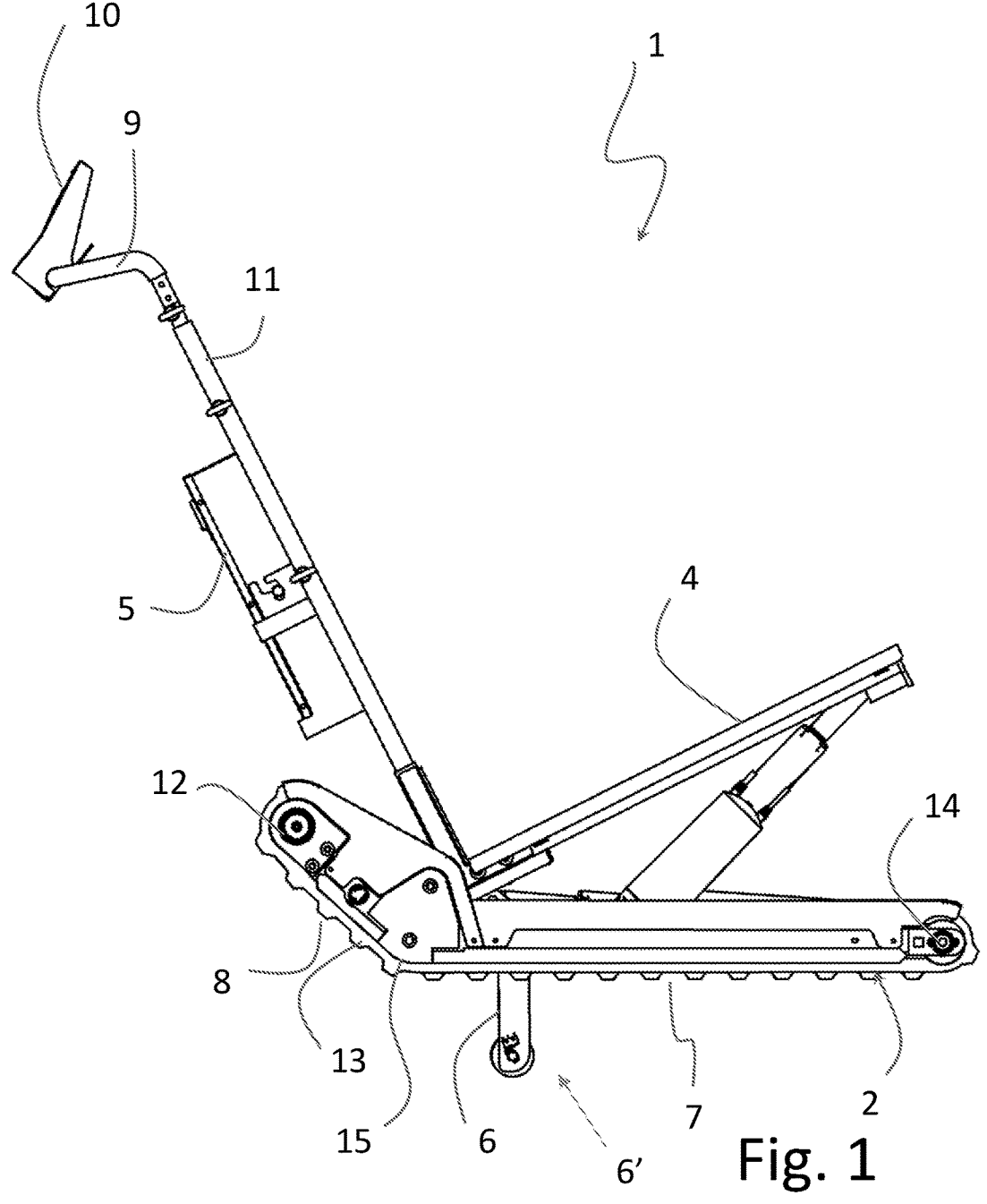
FIG. 1 is a left side view of a self-propelled stair climber according to the present invention.

FIG. 1 illustrates with 1 as a whole a self-propelled stair climber comprising a pair of motorized tracks 2, 3 (only one visible in FIG. 1) configured to be extended along a forward travel direction of the stair climber 1, a tilting loading surface 4 with respect to the tracks 2, 3 to maintain, for example, in a predefined position, in particular with respect to a horizontal plane, and variable, in particular with respect to the aforementioned tracks 2,3, on the basis of the inclination of the tracks 2, 3, such as for example, goods loaded even while the stair climber is going up/down, a battery pack 5 to power the on-board actuators of the stair climber and a stabilization member 6' preferably comprising one or more stabilization arms 6 movable between an extracted position (illustrated in FIG. 1) and a retracted position in which the weight of the stair climber 1 cannot be applied to the arm 6 itself. For example, the retracted position is such that the stabilization arm 6 does not protrude in lateral view with respect to a straight main section 7 of the tracks 2, 3 or towards a pavement (not shown in FIG. 1) on which the main section rests, or it does not protrude with respect to a straight extension of this section.

In the preferred embodiment illustrated in FIG. 1, each track 2, 3 further comprises a raised section 8 inclined with respect to the main section 7 and preferably having a shorter length than that of the latter, a handle 9 for the operator, advantageously designed to be arranged at a vertical height substantially corresponding to that of the operator's torso and a user interface 10, preferably arranged on the handle 9 to manually control the electric actuators of the stair climber and/or activate one or more automatic sequences of movement as will be valid explained better below. According to the embodiment example of FIG. 1, the handle 9 is carried by a pair of uprights 11 to define a portal structure, although further configurations are possible to fix the handle 9 at the desired height. Conveniently, the uprights 11 extend between a lower end provided in proximity to the tracks 2, 3 and an upper end, in correspondence with which the aforementioned handle 9 is suitably mechanically mounted and/or constrained. Furthermore, the handle 9 advantageously tilts together with the uprights 11 around an axis parallel to that of the loading surface 4, and in particular substantially horizontal, so as to make gripping more ergonomic when the stair climber 1 travels up or down. Preferably, the handle 9 tilts by rotating rigidly with the loading surface 4 and therefore shares the rotation axis with the latter.

The user interface 10 in the preferred but non-limiting example of FIG. 1 is fixed to the handle 9 but can also comprise a keyboard and/or a touch screen that can be releasable from a support also arranged elsewhere, with or without wires, so that operator can control the stair climber 1 even without being in front of the handle 9.

For example, the user interface 10 includes at least a push-button panel and/or a joystick, configured to allow the user to operate the stair climber 1 in descent and/or ascent, both in a substantially automatic manner, i.e. in which the ascent and/or descent phases are carried out by the stair climber 1 according to the invention in a substantially autonomous and automatic manner, both manually, i.e. in which the operator sends commands via the aforementioned user interface 10 to the stair climber to start and/or finish at least one of the phases provided for in descent and/or ascent.

Preferably, the handle 9 and the raised portion 8 are arranged on the same side of the stair climber 1 to conventionally define a rear portion of the stair climber which faces an ascent, for example. The raised section 8 allows to have a relatively high adhesion with e.g. an upper edge of a first step of a flight of stairs and thus simplify the advancement of the stair climber when a slope of the path to follow changes locally, e.g. in a substantially punctual way, and of a significant amount of degrees, according to a non-limiting example at least 20°.

This expedient is especially useful in the case of tracks having an elongated configuration, as in the embodiment of FIG. 1 in which a rear drive wheel 12 delimits the raised section 8 and is raised by the pavement when the latter is horizontal, drives a track to belt 13 preferably doweled together with a front wheel 14 and an intermediate wheel 45 interposed between the rear wheel 12 and the front wheel 14 and defining an area of angular variation between the main section 7 and the raised section 8.

Advantageously, in accordance with the preferential embodiment illustrated in the attached figures, the stabilization member 6', and in particular the stabilization arm 6, is substantially arranged so that, when in a retracted configuration, it is housed inside the an area which is laterally delimited between the two tracks 2, 3 in correspondence with a raised section 8 inclined with respect to a main section 7 of said tracks 2, 3.

The stair climber 1 also comprises an electronic control unit (not illustrated in the attached figures) programmed to control the electrical/electronic devices on board on the basis of the commands received via the user interface 10 and possibly other commands received via a special electronic data communication module., in particular without wires, for example through Wi-Fi communication protocols, radio frequency etc. It is possible that the electronic control unit has several modules e.g. a first module programmed to control the loading surface 4, a second module programmed to control the stabilization arm 6 and a third module mechanically mounted on the handle 9 and connected in data exchange with the other two.

The electronic control unit is also advantageously programmed to control the automatic execution of a descent-start and/or climb-start operation and coordinate the activation of the tracks 2, 3, the loading surface 4 and the stabilization arm. 6, in particular following a command given by the user by operating the user interface 10, for example by pressing a dedicated key on the push-button panel or on a joystick.

Figure 2A:
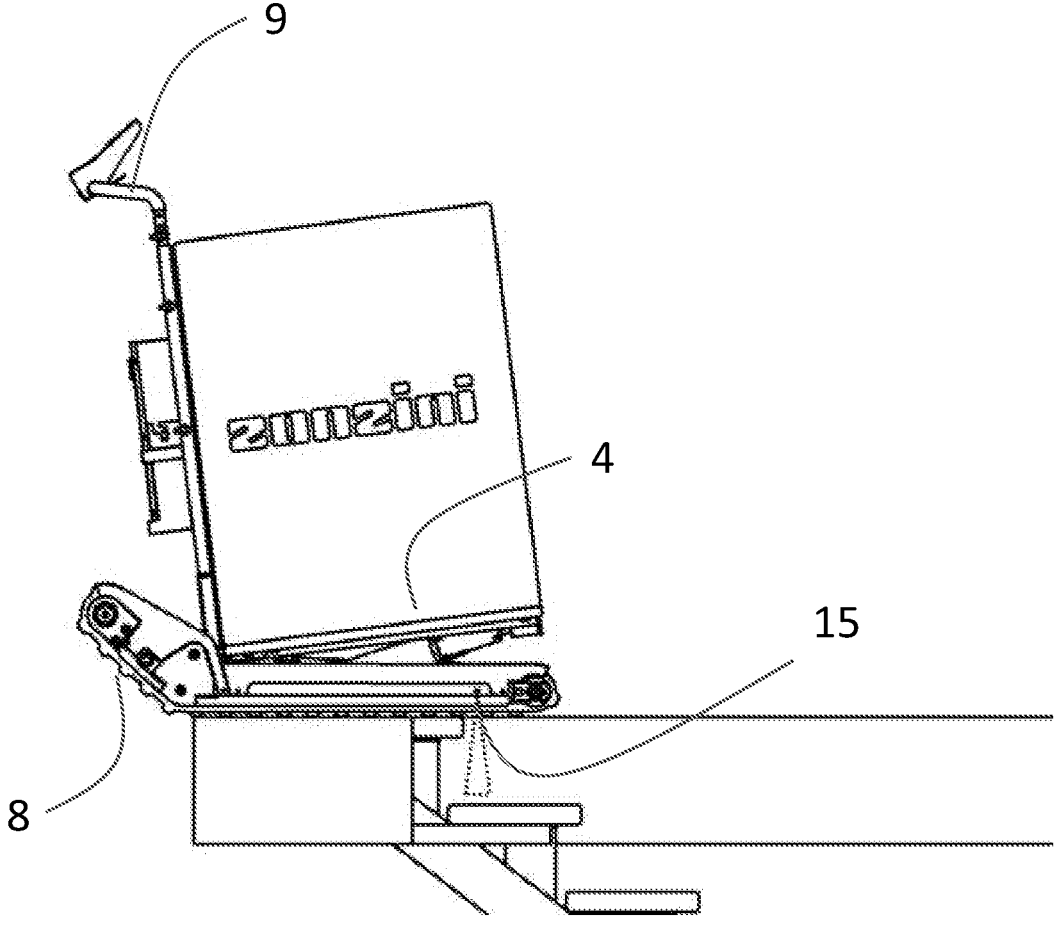
FIGS. 2a-2e are respective side views of the stair climber of FIG. 1 during the relevant phases of a descent-start operation.
Figures 2B, 2C:
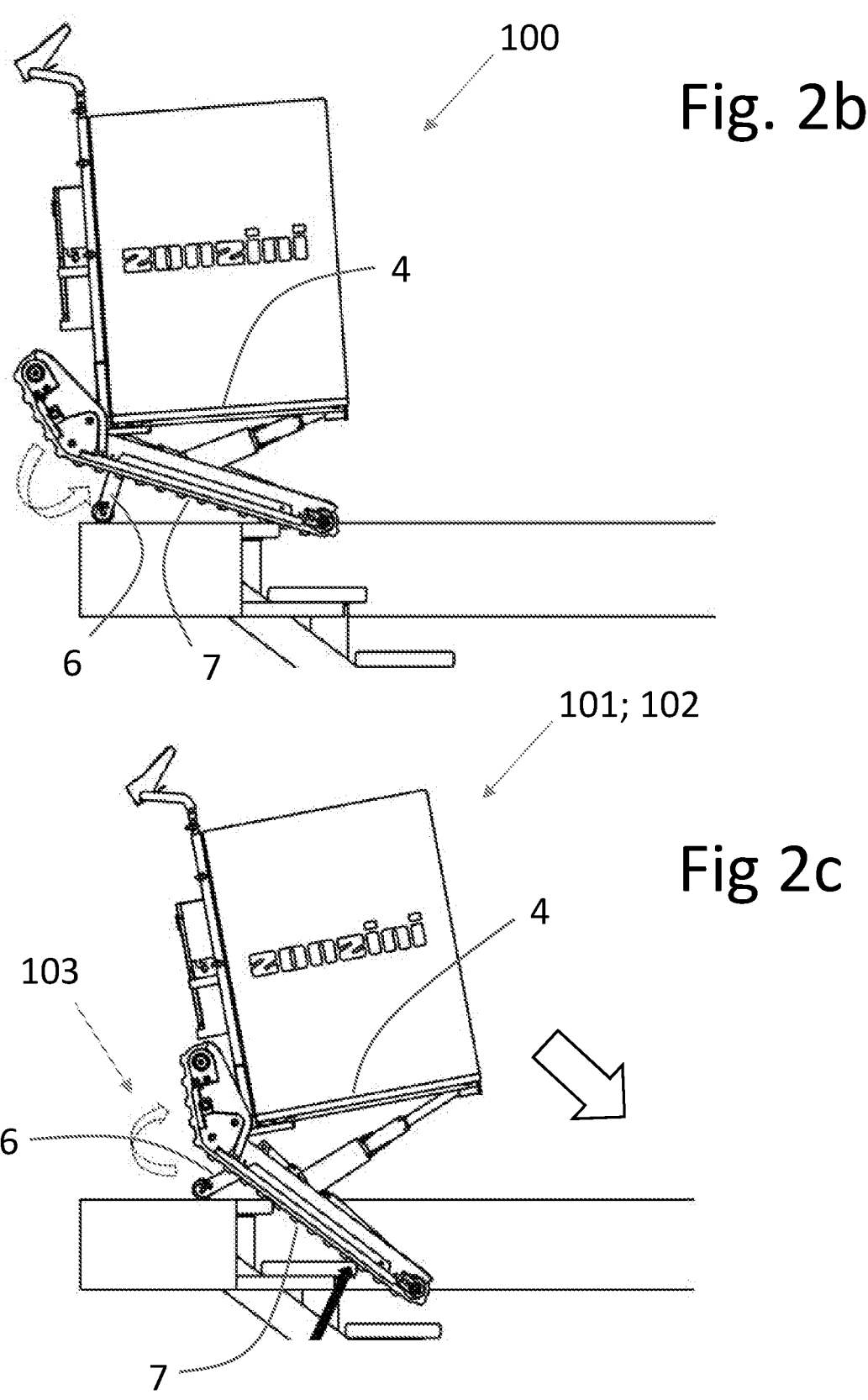
Figures 2D, 2E:
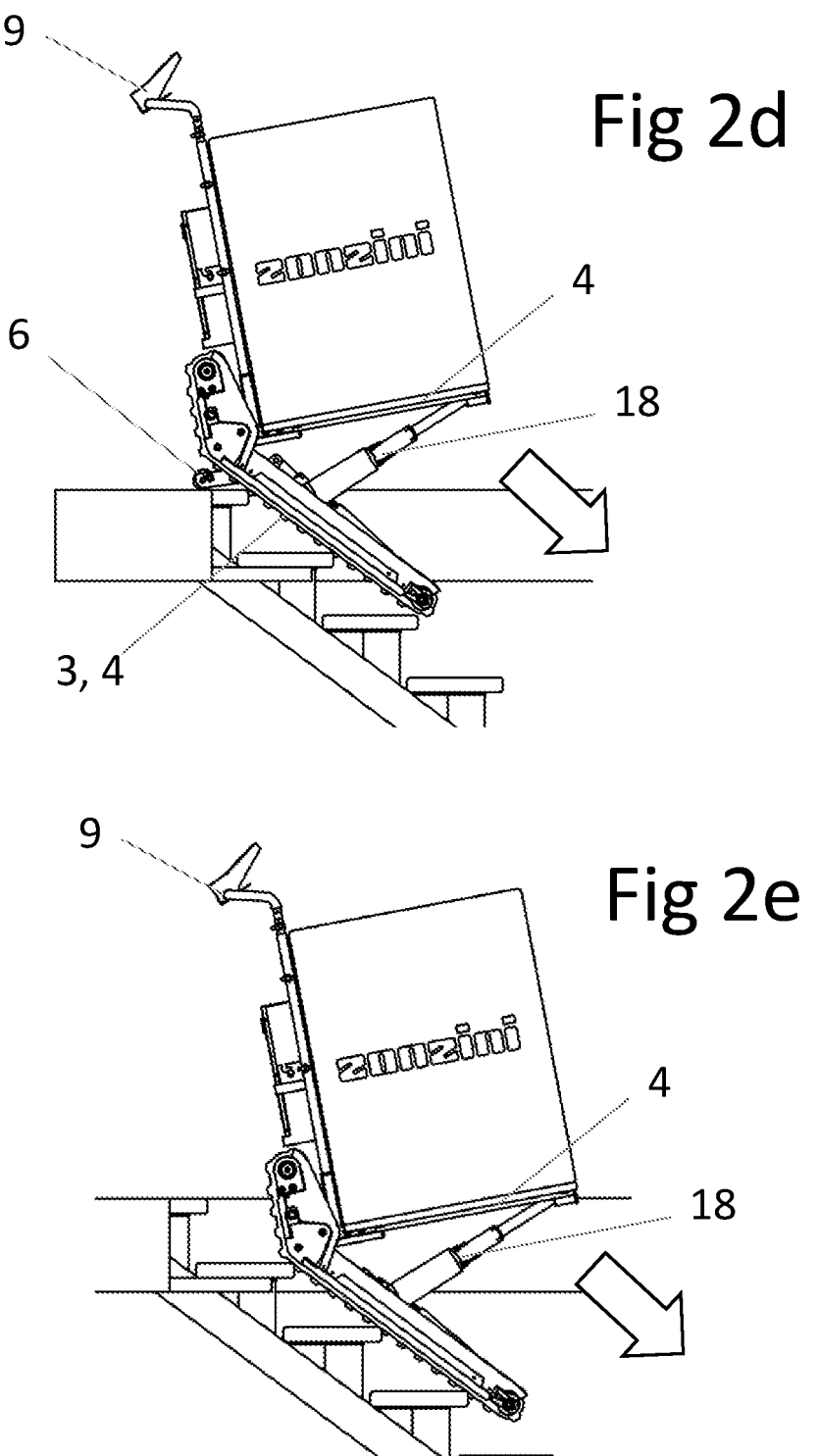

More in detail, before starting a descent, for example along a flight of stairs, the electronic control unit commands the extraction of the stabilization arm 6 according to a step 100 in order to lift an intermediate area of the tracks (FIG. 2*b*). In this configuration, the main section 7 acquires an inclination with respect to the pavement that precedes the descent and the weight of the stair climber 1 is carried by the stabilization arm 6 and by a front portion of the tracks 2, 3. As illustrated in FIG. 2, the stabilization arm 6 is mounted at the rear portion of the stair climber 1, ie preferably the portion that has the raised portion 8 and/or the handle 9 and, prior to the beginning of the descent-start operation, the stair climber 1 is oriented by the operator to present the rear portion of the stair climber 1 in a distal position from the descent and the front portion of the stair climber 1 in a position proximal to the descent, as in FIG. 2*a*.

The control unit is also programmed, according to a step 101, to synchronously or sequentially control the tracks 2, 3 with the stabilization arm 6 and, in particular, the tracks 2, 3 advance towards the descent sequentially starting from the moment the intermediate portion loses adherence, ie detaches from the pavement. It is possible that first the stabilization arm 6 reaches a position of maximum extraction and then the tracks 2, 3 move forward. According to a step 102, the loading surface 4 is operated by the electronic control unit on the basis of the inclination of the tracks 2, 3 to maintain, before and during the descent, a predefined angular position with respect to a horizontal plane, for example detected by an inertial sensor, such as one or more accelerometers. In the descent-start operation the loading surface 4 can begin to tilt synchronously before or after the extraction of the stabilization arm 6 and, advantageously, the step 102 is sequential and precedes the step 100, i.e. the loading surface 4 is inclined, in particular rotated around a substantially horizontal axis of rotation towards the rear portion, preferably together with the handle 9 before extracting the stabilization arm 6 so that, when the stabilization arm 6 is extracted and the main section 7 is raised, the loading plane 4 is brought into a substantially horizontal position or slightly, ie in an exemplary and non-limiting manner not more than 10°, inclined with respect to a horizontal reference plane. Preferably, before step 101, the loading plane 4 is horizontal or inclined towards the rear portion. In the latter case, the center of gravity of the load is more rearwardly displaced so that most of the load is carried by the stabilization arm 6 and this weight distribution improves the stability of movement along the descent.

The control unit is programmed to continue step 102, i.e. the advancement of the stair climber 1 on the descent, until a front portion of the tracks 2, 3 contacts the second step or an inclined plane. It should be noted that while the tracks 2, 3 advance, for most of the time except for the first moments, a portion of the front end of the tracks 2, 3 is suspended on the steps/inclined plane until, due to the advancement and the consequent rigid rotation of the stair climber 1, this end portion does not contact the second step or the inclined plane. Therefore, the inclination with respect to the horizontal of the tracks 2, 3 reached in phase 100 is proposed to approach and possibly reach but not exceed the inclination of the descent. According to this embodiment, the extraction position of the arm 6 and/or the length of the arm itself and/or the length of the tracks 2, 3 is such as to be less than or approximate the inclination of a ladder, for example according to a standard of building construction in force, eg for Italy 75°. Furthermore, the stair climber 1 comprises a revolution counter or other sensor for directly or indirectly measuring a distance traveled by the tracks 2, 3, in particular after the stabilization arm 6 has been extracted to pre-tilt the tracks 2, 3. By means of this measurement, the control unit calculates a distance and compares it with a pre-set condition in order to ensure that, upon reaching this condition, the tracks 2, 3 have reached and rest firmly on the edge of the second step (FIG. 2*b*).

Otherwise, for example in order to be able to adapt to various types of descents, the contact condition of the front portion of the tracks 2, 3 with the second step/inclined plane is detected and processed by the electronic control unit in numerous ways, for example through the sensor inertial (the contact with the step generates a well recognizable acceleration peak), or through a load cell arranged on the stabilization arm 6 (through the contact of the front portion of the tracks 2, 3 the weight is redistributed and, in particular, the stabilization arm 6 is unloaded but, at the same time, becomes an obstacle to the further advancement of the tracks 2, 3). It is also possible that the stair climber 1 comprises further inertial sensors, e.g. like those of the loading platform 4, to measure the absolute inclination of the tracks 2, 3. In this case, the electronic control unit can be programmed, during the descent-start procedure, to compare the inclination of the loading surface 4 and that of the tracks 2, 3 and to retract the stabilization arm 6 when the difference between these inclinations remains constant for a predetermined time while the stair climber 1 advances at a predetermined speed: this condition occurs when the tracks 2, 3 rest firmly on two edges of adjacent steps (FIG. 2*b*).

When the control unit has satisfied the forward condition or has received a control signal representative of the fact that the main section 7 is sufficiently supported by the steps, in a step 103 the stabilization arm 6 lifts off the floor and is retracted. It is also possible that, for a transient, the tracks are already on the edges of the steps, the stair climber advances and the stabilization arm retracts synchronously with the advancement, in accordance with the attached FIG. 2*b*, in which phase 101, the step 102 and the step 103 are substantially synchronized to be carried out at the same time.

The descent-start operation can be initiated via a manual command, e.g. via the user interface 10, by the operator or automatically via an obstacle sensor 15, e.g. capable of measuring a distance, preferably carried by the front portion of the stair climber 1.

Examples of this sensor have already been indicated in the previous paragraphs, i.e. optical, e.g. a video camera, or a proximity camera such as radar or ultrasound. The obstacle sensor 15 is connected in data exchange to the control unit and the latter is programmed to start the descent-start operation after the signal of the obstacle sensor 15 is representative of a spacing beyond a predefined threshold of the front portion of the stair climber 1 with respect to the flooring, for example the front portion protrudes from the flooring and faces below a step (FIG. 3).

According to a preferred embodiment, the control unit is also programmed to automatically perform an end-of-climb operation and coordinate the activation of the tracks 2, 3, the loading surface 4 and the stabilization arm 6, in accordance with the attached FIGS. 3a-3e.

Advantageously, the activation of the movement of the stabilization member 6', and in particular of the stabilization arm 6, can be controlled automatically on the basis of a signal from a sensor, e.g. be it an obstacle sensor 15, 16 or the like, or it can be controlled on the basis of an input provided by the operator by acting on the user interface 10 of the stair climber 1.

Figure 3A:
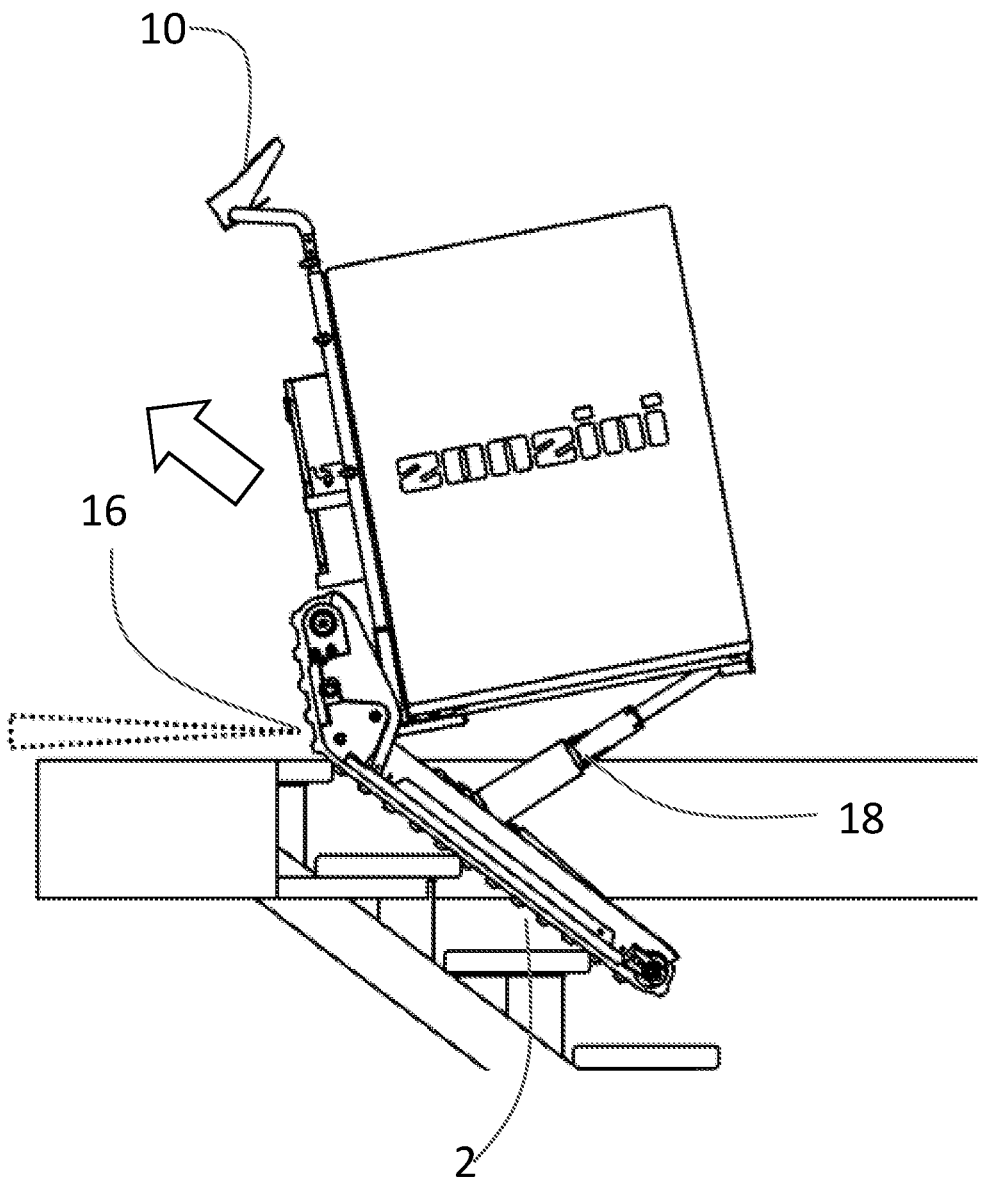
FIGS. 3a-3e are respective side views of the stair climber during the relevant phases of an end-of-climb operation.

In particular, at the end of an climb, for example along a flight of stairs, the electronic control unit commands, in a step 200, the extraction of the stabilization arm 6 so as to bring the arm itself closer to the pavement that follows the climb (FIG. 3a). In this configuration, the main section 7 remains adherent to the slope, e.g. to the flight of stairs, and the weight of the stair climber 1 is carried by the tracks 2, 3.

Advantageously, the extraction of the stabilization arm 6 is blocked on the basis of the signal of the proximity or support sensor, mechanically associated with the stabilization arm 6 itself, to detect the contact between the flooring and the extracted stabilization arm 6 or a shorter distance. at a predefined threshold, eg 0.5 cm, between one head of the stabilization arm 6 and the flooring. Consequently, the stair climber 1 was previously oriented by the operator to go up so that the rear portion of the stair climber faces the climb itself.

Advantageously, in accordance with a further embodiment in which the sensor 33 is a proximity sensor, for example of the optical type, the proximity or support sensor 33 of the stabilization arm 6 of the stabilization member 6' allows to know precisely the relative position of the stabilization arm 6 with respect to the ground, obviating the need for the arm 6 to come abut against the ground itself.

Conveniently, the provision of mechanically associating/mounting the proximity or support sensor 33 to/on the stabilization arm 6 allows to know the distance from the ground without the need to make the stair climber 1 assume unstable positions, keeping the stabilization arm 6 in the position foreseen in every operating condition, thus helping to maintain the overall stability of the stair climber according to the invention in every operating condition, for the entire duration of the ascent and/or descent. The control unit is programmed, after stopping the extraction of the stabilization arm 6, to activate the advancement of the tracks 2, 3 according to a step 201 (illustrated in the attached FIG. 3c). This causes a detachment of the stabilization arm 6 from the pavement that follows the ascent or a distance from said pavement greater than the predefined threshold. This is detected by the contact or proximity sensor and, through the control unit during step 201, the stabilization arm 6 is further extracted until it comes into contact with the pavement or below the predefined threshold. This movement of the stabilization arm 6 is preferably performed synchronously with the movement of the tracks 2, 3 or sequentially, i.e. when the desired contact or proximity of the stabilization arm 6 with the pavement following the ascent is detected, e.g. a landing, the tracks 2, 3 are controlled to advance by a predefined amount and for example measured by a speed sensor, e.g. an encoder, of the traction motor of the tracks. At the end of this predetermined advancement, the tracks 2, 3 lock and the stabilization arm 6 is further extracted until it contacts the landing or is proximal. The extraction movement of the stabilization arm 6 and the advancement of the tracks 2, 3 on the ascent can be synchronous or sequential. In addition, the stabilization arm 6, in this phase, essentially performs the function of a pavement feeler and the weight of the stair climber 1 is carried by the tracks 2, 3. When subsequently the center of gravity of the stair climber exceeds the edge of the last step, the stabilization arm will begin to carry an increasing share of the weight of the stair climber.

Figures 3B, 3C:
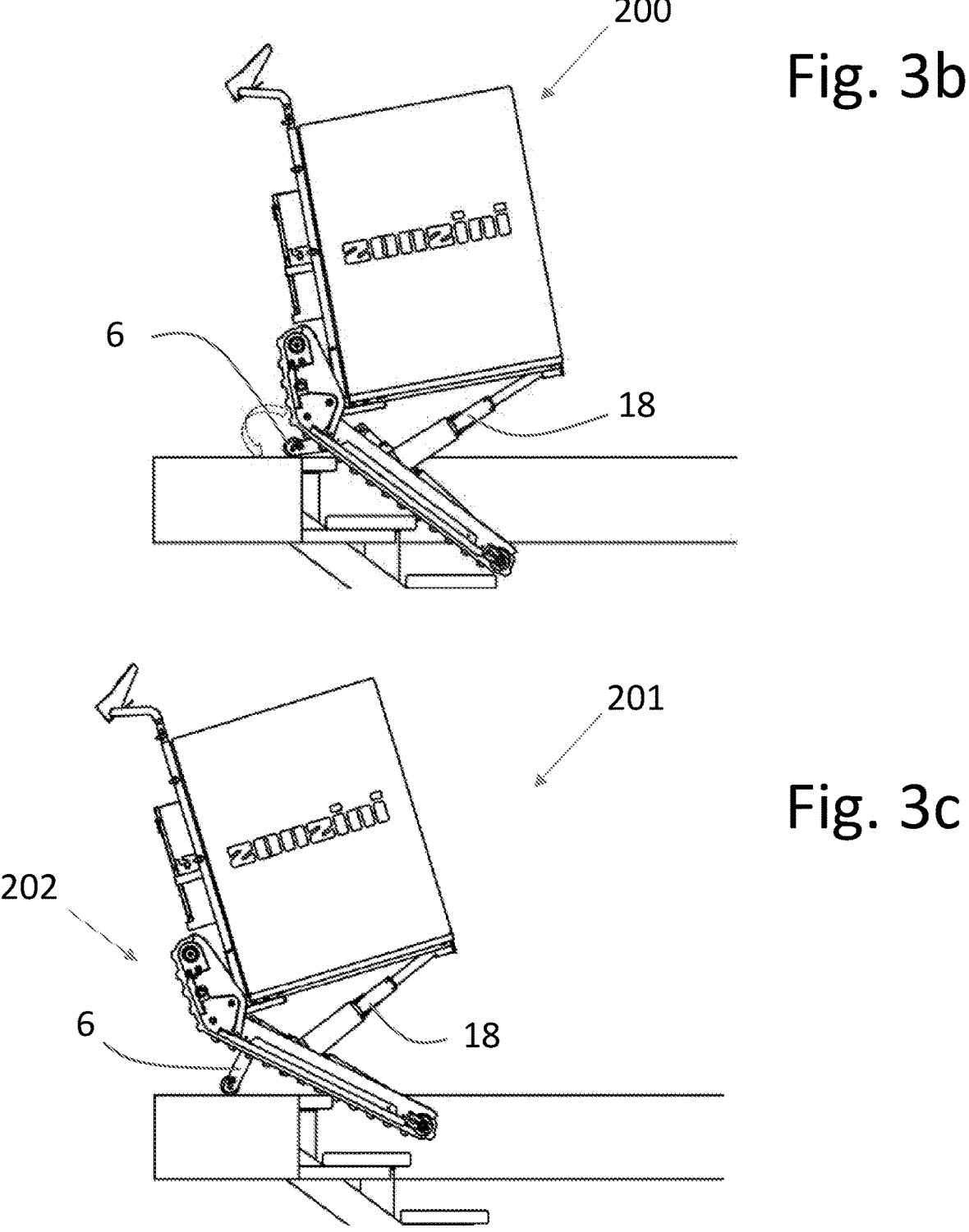
Figures 3D, 3E:
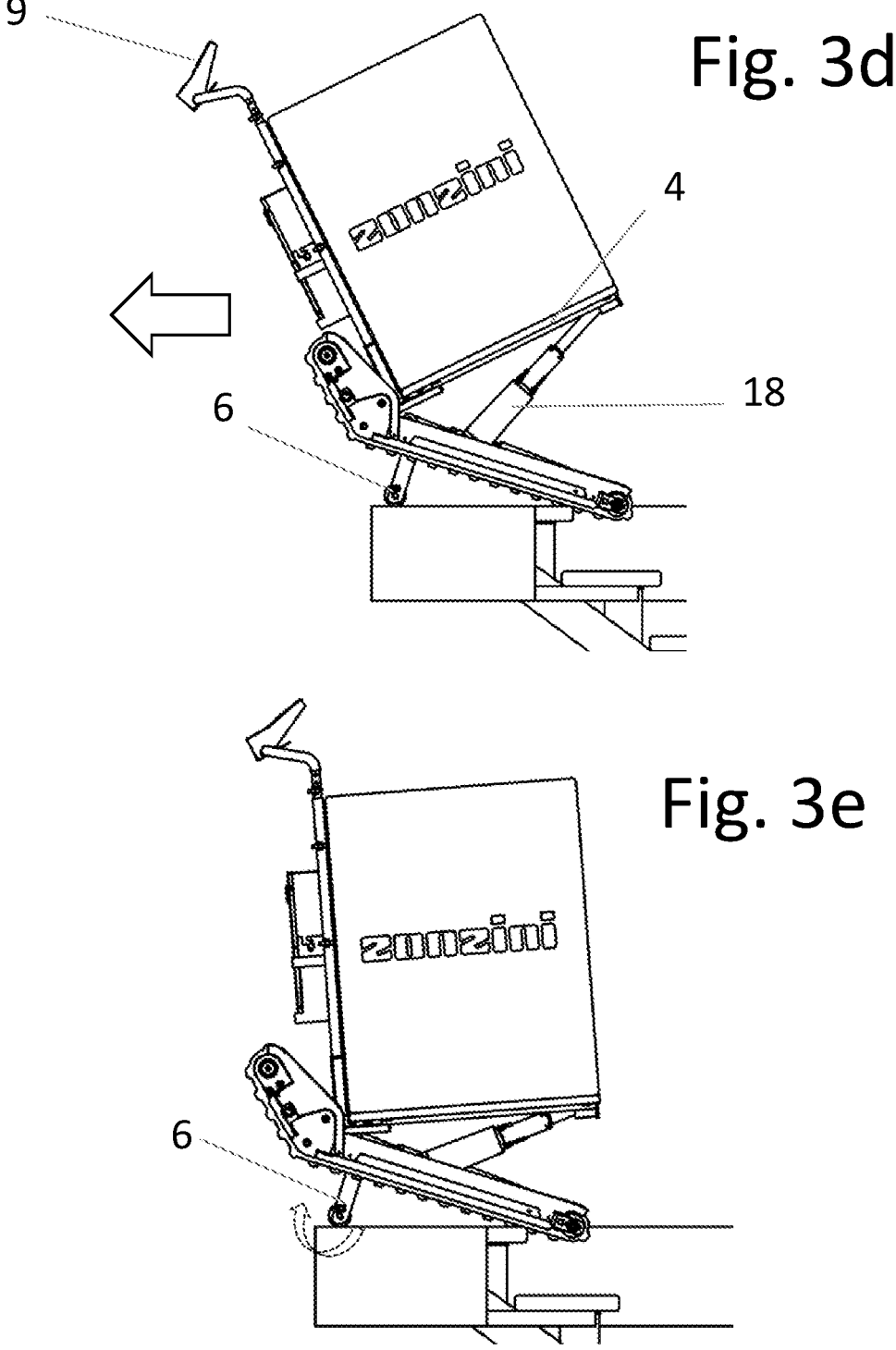

According to the end-of-climb operation, the extraction of the arm 6 consequently to the advancement of the tracks proceeds until, in a step 202, the rear portion of the stair climber 1 does not lose grip, e.g. distances itself, from the climb e.g. from the steps (FIG. 3c). This can be detected by the control unit either directly by means of a suitable sensor, such as for example a load cell, microswitch or proximity/distance sensors present on the stabilization arm 6 or indirectly for example as follows.

When the front portion loses grip, the weight of the stair climber 1 is carried by the tracks 2, 3 and by the stabilization arm 6 and, consequently, following an advancement of the tracks 2, 3, a detachment of the stabilization arm 6 is not caused by the flooring. The control unit, for example by monitoring the time in which, following the advancement of the tracks 2, 3, the signal for detachment or removal of the stabilization arm 6 is received, can establish whether the front portion still adheres to the stairs or to the inclined plane or, when no signal for detachment or removal of the stabilization arm 6 is received following the advancement of the tracks 2, 3, if the weight of the stair climber 1 is partially carried by the arm itself and the front portion is spaced from the stairs. Alternatively, an indirect survey relates an advancement of the stair climber 1, measured e.g. via a rev meter of the track motor (s) and the contact sensor of the stabilization arm 6: if contact (and not proximity) is detected for a number of revolutions or for a predefined fraction of a revolution of the motor (s), means that the stabilization arm 6 is loaded by a portion of the weight of the stair climber and the front portion of the tracks 2, 3 has detached from the step/climb.

Also in this case it is important that the maximum extraction position of the stabilization arm 6 is such that, when the main section 7 and in particular the front portion are in contact with the stairs, the head of the stabilization arm is spaced from the flooring.

The end-of-climb operation can be initiated via a manual command, e.g. through the user interface 10, of the operator or automatically through an obstacle sensor 16 preferably carried by the rear portion of the stair climber 1. Examples of this sensor are optical, e.g. a camera, or a proximity camera with examples already indicated in the previous paragraphs. The obstacle sensor is connected in data exchange to the control unit and the latter is programmed to start the end-of-climb operation after the obstacle sensor signal is representative of a significant decrease in inclination, e.g. the achievement of a horizontal pavement and/or the absence of obstacles within a predefined distance from the rear portion (FIG. 3a).

Advantageously, said electronic control unit is programmed to ignore the signal of said proximity sensor or contact 33 during the descent-start phase.

In this way, the stair climber 1 can tilt towards the descent thanks to the thrust of the stabilization member 6', nominally reaching a condition of unstable equilibrium, necessary to be able to reach the desired inclination of the stairs or of the inclined plane to go downhill.

Advantageously, said obstacle detector 16 is mechanically mounted in a rear portion of said stair climber 1 and is configured to detect a larger area than said further obstacle detector 15, mechanically mounted at a front portion of said stair climber 1.

Figure 4A:
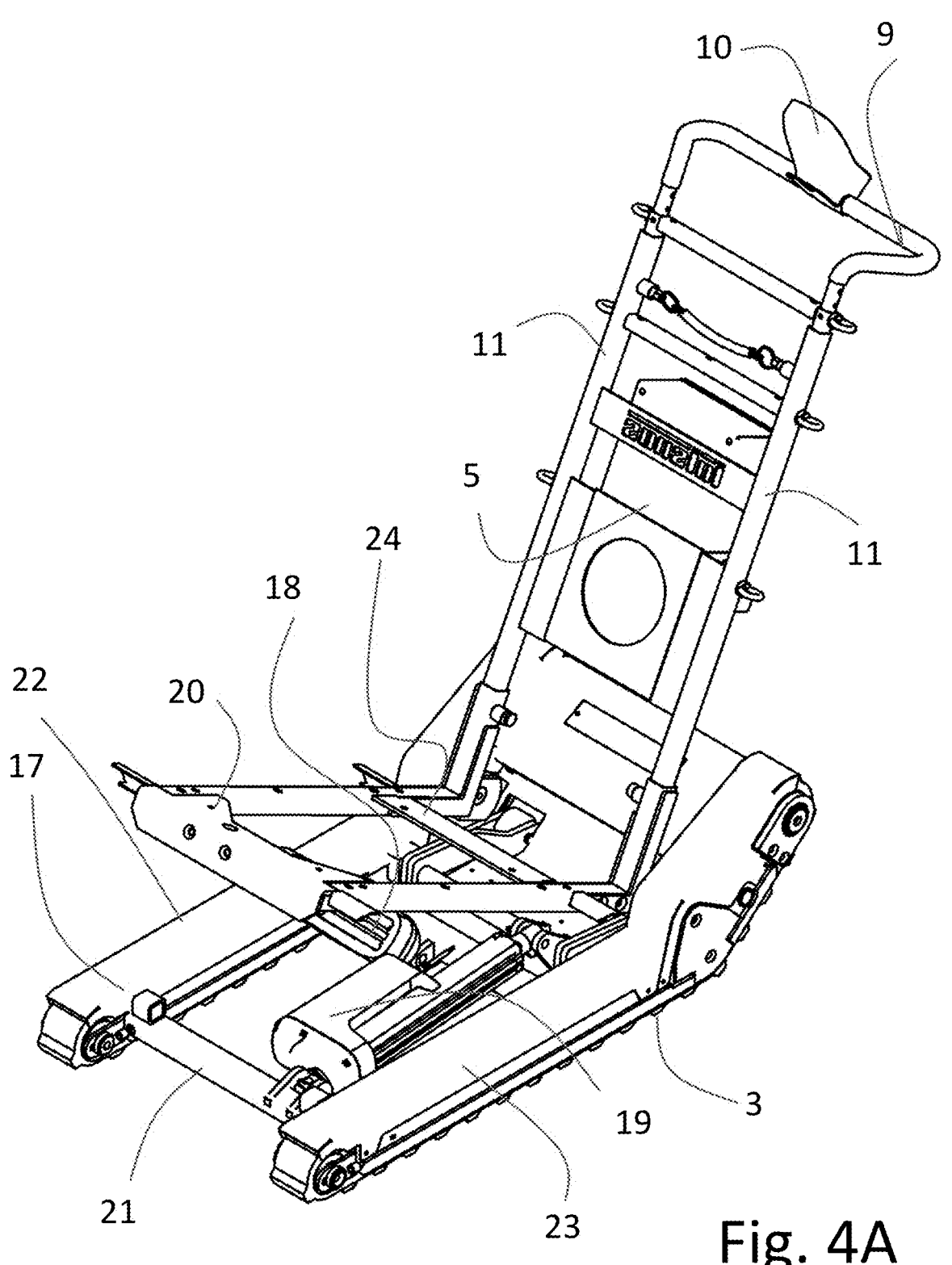
FIGS. 4A and 4B are perspective views of the stair climber according to the present invention, in extended (FIG. 4A) and retracted (FIG. 4B) configurations, with details removed for clarity.
Figure 4B:
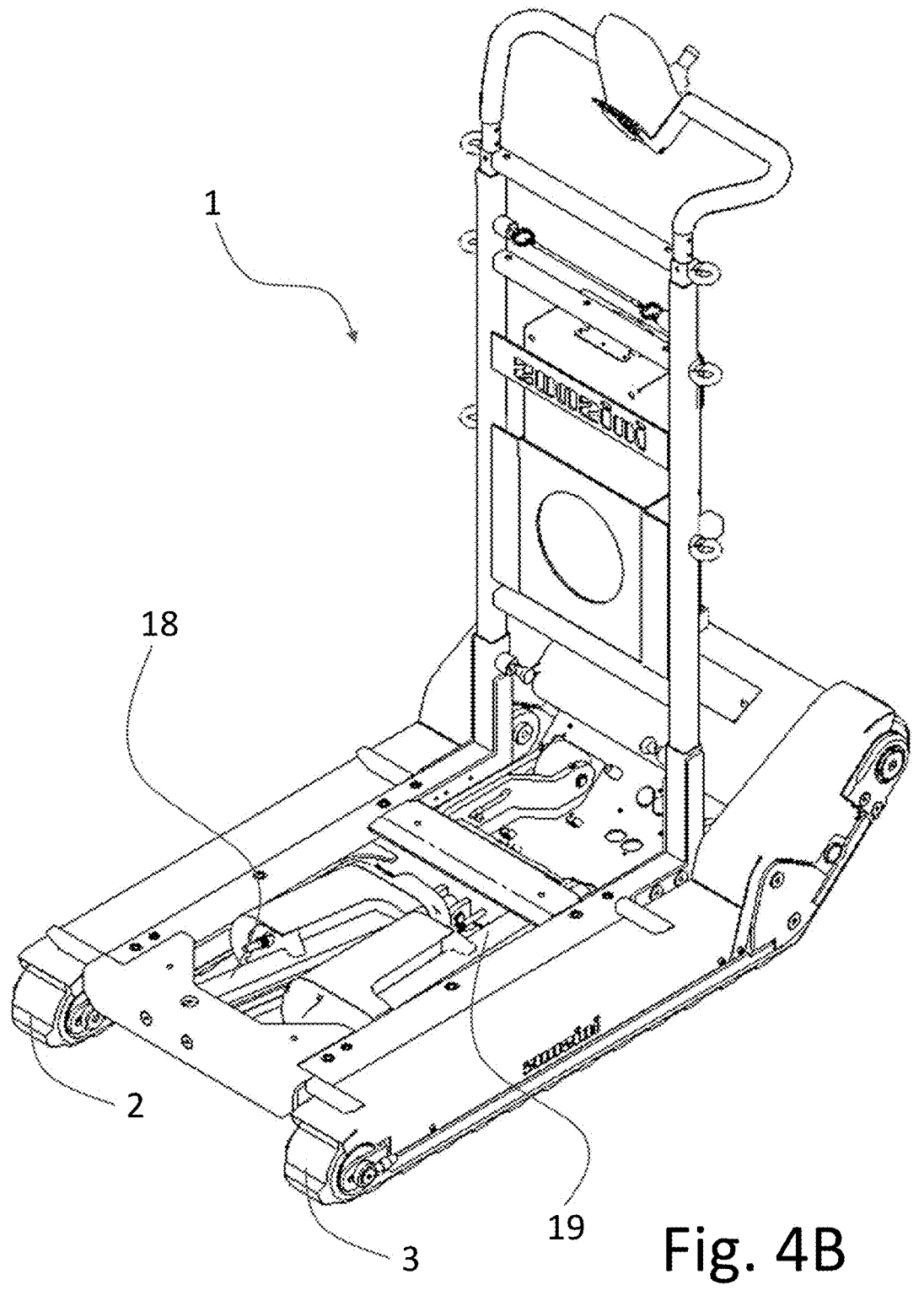

FIGS. 4A and 4B illustrate a preferred embodiment of the stair climber 1 in which a support structure 17 carrying the tracks 2, 3, a preferably linear actuator 18 for the loading surface 4 and a preferably linear actuator 19 for the loading arm is shown. stabilization 6. In particular. the actuator 18 is partially extracted and the actuator 19 is retracted (FIG. 4A).

In order to contain the overall dimensions and to keep the center of gravity of the stair climber 1 low, the support structure 17 defines a window inside which the actuators 18, 19 are housed substantially parallel to each other which, in retracted configuration, are substantially side by side, preferably substantially parallel to each other, to the tracks 2, 3 respectively. In particular, the window defined by the support structure 17 is open towards the loading surface 4 to allow the actuators 18, 19 to tilt upwards during extraction. Preferably, in the retracted configuration, the actuators 18, 19 are substantially parallel to the longitudinal development direction of the tracks 3, 4 and in particular they are substantially parallel to the longitudinal development direction of the main section 7 of the tracks 3, 4.

Advantageously, the actuators 18, 19 define with the aforementioned longitudinal development direction of said tracks 3, 4 a lower angle of 30°, preferably lower than 20° and more preferably lower than 10°.

Advantageously, the window defined by the support structure 17 remains defined between the tracks 2, 3. Conveniently, in the retracted configuration, the actuator 18 for the loading surface 4 and the actuator 19 for the stabilization arm 6 are side by side. they are parallel to each other and are completely housed within the zone (space) delimited laterally between the two tracks 2, 3 and, preferably, they are also housed within the overall height defined by each of said two tracks 2, 3.

Furthermore, since the actuator 18 is proximal to the track 2 and substantially parallel when retracted to the relative main straight section 7 and the actuator 19 proximal to the track 3 and substantially parallel when retracted to the relative main straight section 7, the actuator 18 is connected to the loading surface 4 in a hinge 20 spaced transversely from a center line of the loading surface 4. In particular, at least one of the extractable stems of the actuators 18, 19 defines in retracted configuration a maximum angle of 30° with the main straight section 7 when the last one rests on the pavement.

According to the embodiment of FIGS. 4A and 4B, the support structure 17 preferably comprises a front cross member 21, a first longitudinal member hidden by a track cover 22 for carrying the track 2, in particular the intermediate wheel, the front wheel and the rear wheel. a second side member hidden by a track cover 23 to carry the track 3 and a rear cross member (not shown). The rear and front cross members connect the side members to each other and the actuators 18, 19 when retracted (FIG. 4B), are placed side by side with the side members respectively.

The loading surface 4 comprises a flat wall (not shown in FIGS. 4A and 4B) carried below by a frame 24 and is hinged to the support structure 17. According to the embodiment of FIGS. 4A and 4B, the actuator 18 also tilts the mounted elements 1 and the handle 9 which are rigidly connected to the loading surface 4.

Figure 5:
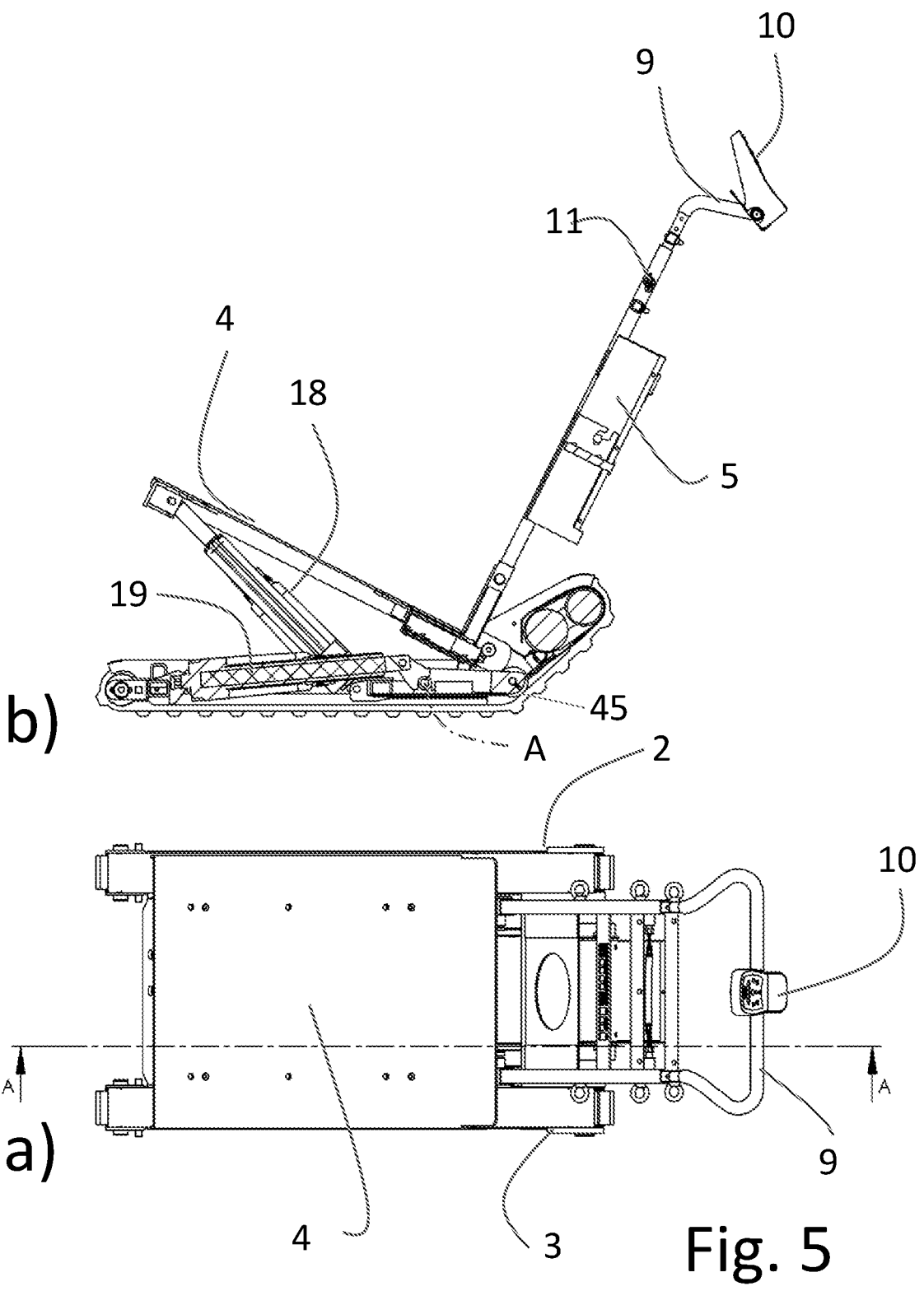

FIG. 5a is a plan view of the stair climber 1 with the loading surface 4 inclined and FIG. 5b illustrates a section of FIG. 5a in which the stabilization arm 6 rotates around a rotation axis A (highlighted in the attached FIGS. 6 and 8) substantially parallel to the front crosspiece 21 and to a tilting axis of the loading surface 4. The axis of rotation A is therefore transverse, in particular perpendicular to a straight forward travel direction of the stair climber 1.

Figure 6:
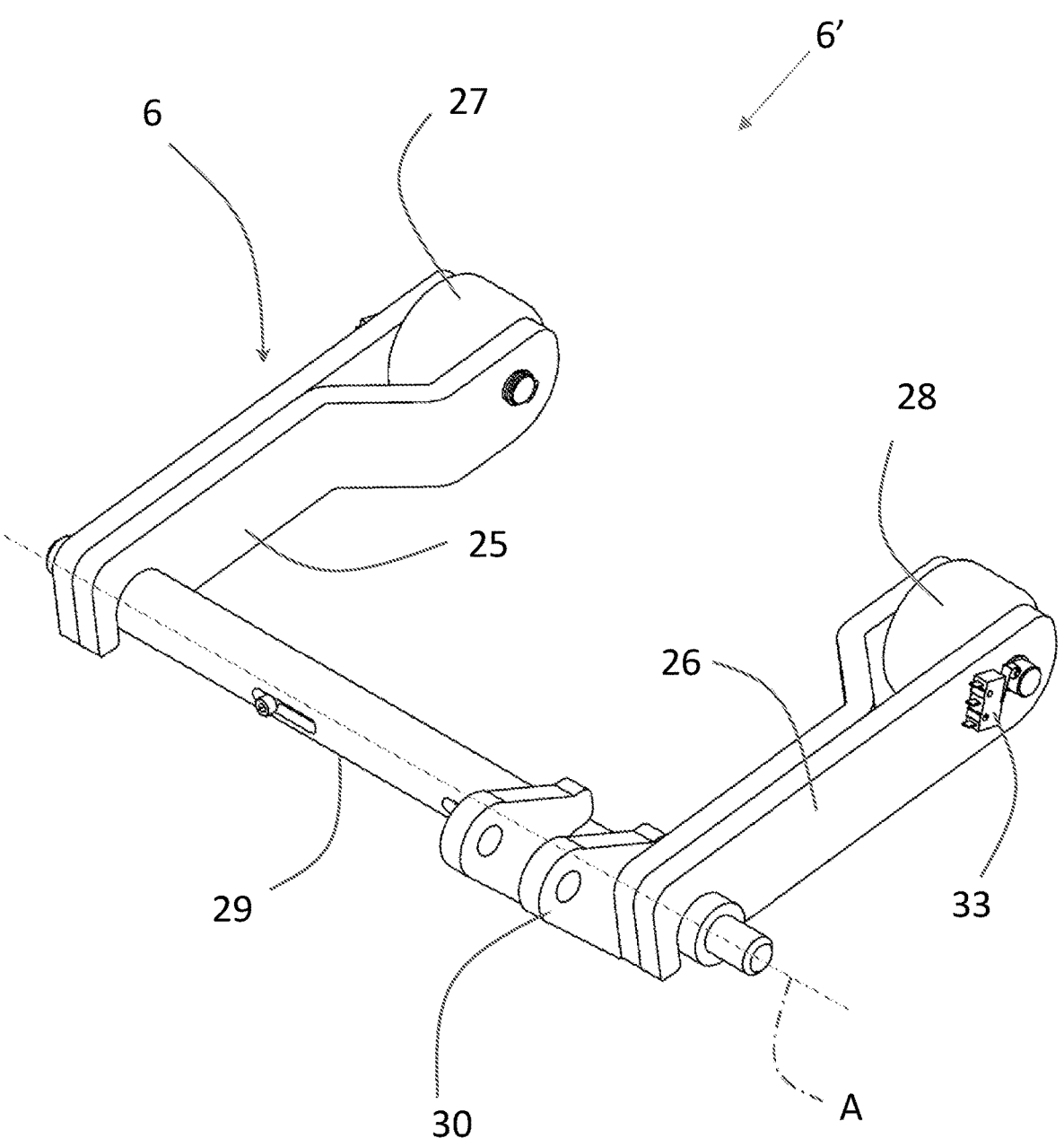
FIG. 6 is an enlarged perspective view of a component of the stair climber of the present invention, concerning a stabilization member
Figure 7:
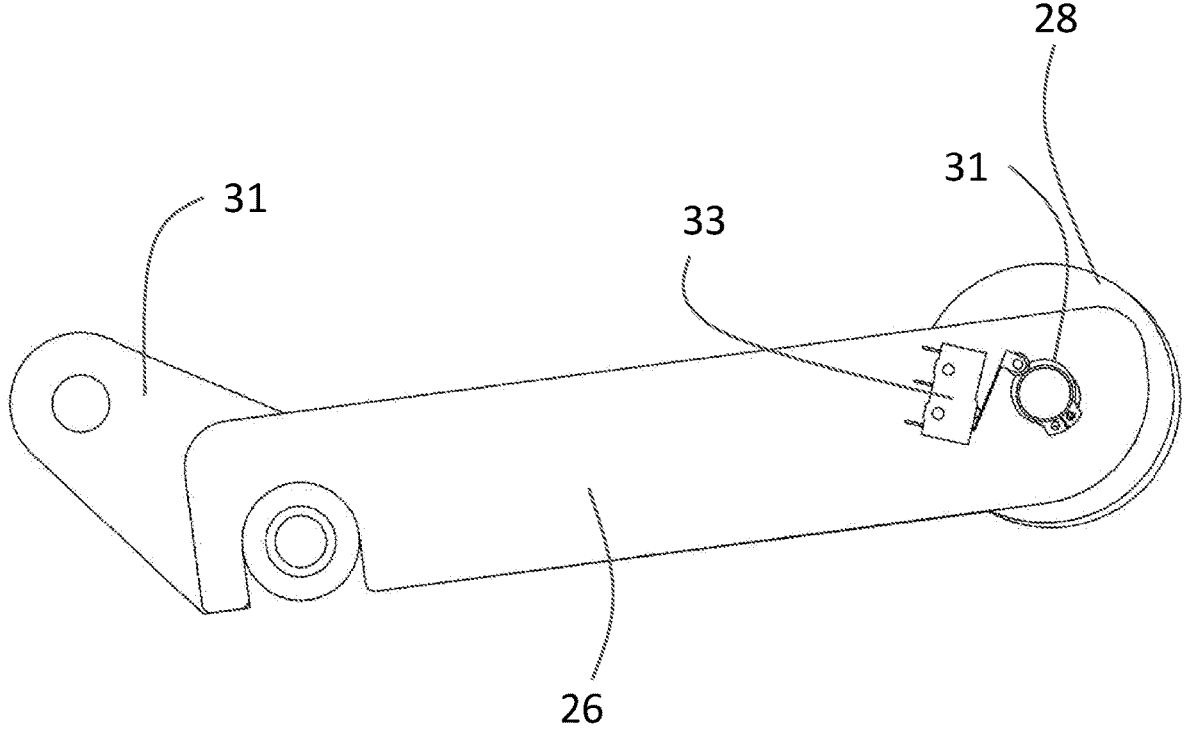
FIG. 7 is a left side view of the component of FIG. 8.
Figure 8:
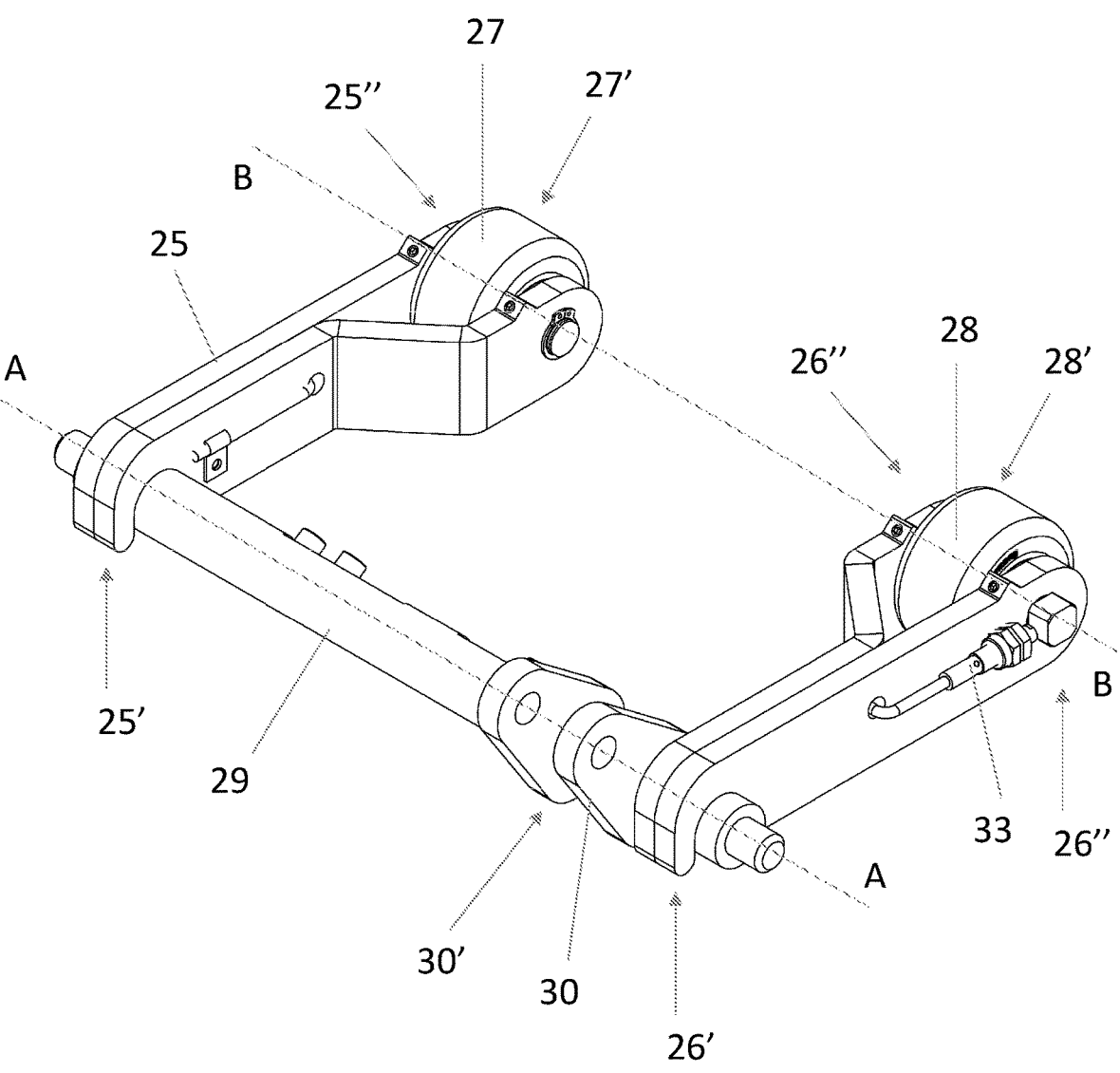
FIG. 8 is an enlarged perspective view of a component of the stair climber of the present invention, concerning a stabilization member in a second embodiment thereof.

FIG. 6 and FIG. 8 illustrate the stabilization member 6' of the stair climber 1 according to the invention. In particular, the attached FIG. 6 shows the stabilization member 6' in its first embodiment and the attached FIG. 8 shows the stabilization member 6' in its second embodiment.

Conveniently, the stabilization member 6' defines at least one contact area 27', 28', in particular made by means of respective rollers 27, 28. These contact areas 27, 28 are configured to come into contact with the ground with the stabilization member 6' in the extracted configuration, to give the stair climber 1 a stable equilibrium configuration. Advantageously, in accordance with the embodiments of the attached figures, the stabilization member 6' comprises the aforementioned stabilization arm 6, which is double (as described more clearly below) and advantageously defines a lever of the first type around the axis of rotation A unfavorable for the actuator 19. In this way, a relatively short stroke of the actuator 19 corresponds to a relatively large angular movement of the stabilization arm 6. With the term "lever of the first type" (also known as the term "first kind lever" or "first class lever") must be understood, within the meaning of this patent, a lever in which the fulcrum is substantially interposed between the two forces acting on the lever.

Preferably, the stabilization arm 6 comprises a first and a second branch 25, 26, advantageously substantially parallel to each other, each of which carries a respective roller 27, 28 configured to be placed in contact with the flooring with the arm 6 in an extracted configuration.

More in detail, the branches 25, 26 have a substantially elongated shape and develop between a first end 25', 26', rotatably mounted to the support structure 17, in particular around the rotation axis A, and a second end 25", 26", in correspondence with which the aforementioned contact area 27', 28' remains defined.

Preferably, the contact areas 27', 28' and the rotation axis A are substantially coplanar. Preferably, in accordance with the embodiments illustrated in the attached figures and with particular reference to the attached FIGS. 6-10, the contact areas 27', 28' remain defined on an external surface, in particular substantially cylindrical, of the two aforementioned rollers 27, 28, suitably rotatably constrained to the branches 25, 26 around a second axis of rotation B substantially parallel to the axis of rotation A.

The branches 25, 26 are advantageously connected transversely, in particular at their respective first end 25', 26', by a bar 29, extending along the axis of rotation A and rotating around the axis of rotation A itself.

Conveniently, the stair climber 1 comprises articulation means 30' mechanically interposed between said actuator 19 and said stabilization member 6', advantageously configured to allow a rectilinear motion of said actuator 19 to be transformed into a rotational motion of said stabilization member 6', to move it between the extended configuration and the retracted configuration.

More in detail, the articulation means 30' comprise at least one protruding element, mechanically associated with said stabilization member 6' and able to define at least one articulation axis C, substantially parallel with the rotation axis A. Advantageously, the articulation axis C is also parallel to the second axis of rotation B of the rollers 27, 28. Conveniently, the contact areas 27', 28' are defined on the opposite side with respect to the axis of articulation C, with reference to the axis of rotation A.

Advantageously, moreover, the axis of rotation A defines with the axis of articulation C a first lying plane D and defines with the contact areas 27', 28' and in particular with the second axis of rotation B of the rollers 27, 28, a second lying plane E inclined with respect to the first lying plane D.

Preferably, the first lying plane D and the second lying plane E define an articulation angle, suitable for allowing at least a partial transfer of the rectilinear motion of the actuator 19 to a rotational motion of the stabilization member 6'.

Conveniently, the articulation means 30 comprise at least a fork 30, which defines the aforementioned axis of articulation C, in particular by means of two eyelets 30" adapted to rotatably house corresponding terminal pins of the actuator 19.

In particular, the branches 25, 26 are moved by the actuator 19 through the fork 30 carried by the bar 29. The fork 30 has a shorter useful length than that of the branches 25, 26 and is spaced transversely with respect to a center plane of the branches 25, 26. This plane is preferably coincident with the center plane of the loading plane 4.

Advantageously, said proximity or support sensor 33 is mechanically fixed to at least one of said first and second branches 25, 26. Preferably, said proximity or support sensor (33) is mechanically fixed in proximity to at least said rollers (27, 28). Conveniently, the proximity sensor 33 can be activated to detect the distance of the stabilization arm 6 of the stabilization member 6' before at least one of the rollers 27, 28 comes into contact with said ground.

Preferably, the proximity sensor 33 can be activated with said stabilization member 6' in a retracted configuration and/or in an extracted configuration, advantageously in such a way that the stair climber 1 obtains and/or maintains a stable equilibrium configuration. More clearly, the proximity sensor 33 can be activated to measure the distance of the stabilization member 6' from the ground, whether the latter has already been extracted, for example at the end of a climb, or whether it has been retracted during the climb. and/or descent, without the need to move said stabilization member 6' if not necessary.

Figure 9:
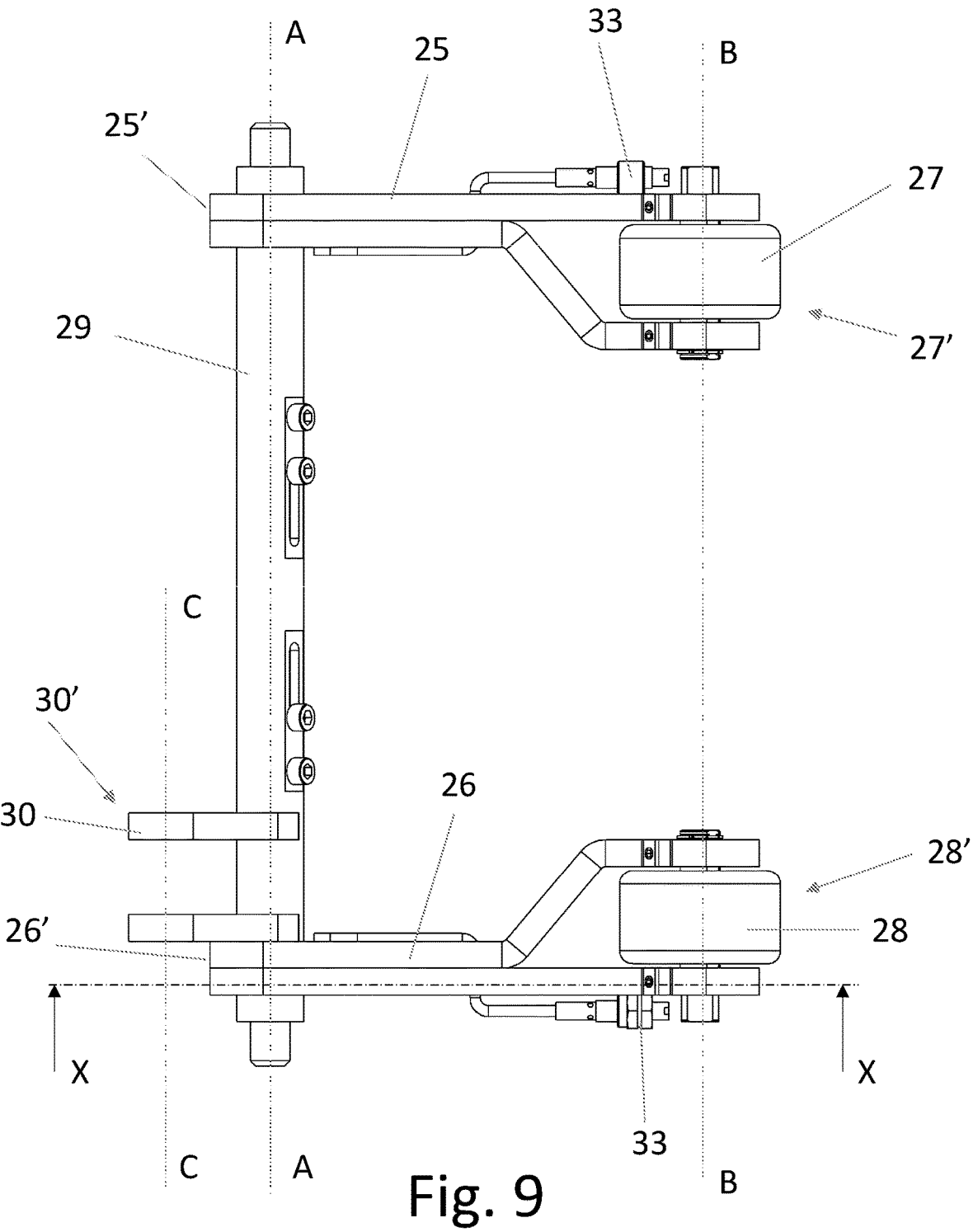
FIG. 9 is a top plan view of the stabilization member of FIG. 8.
Figure 10:
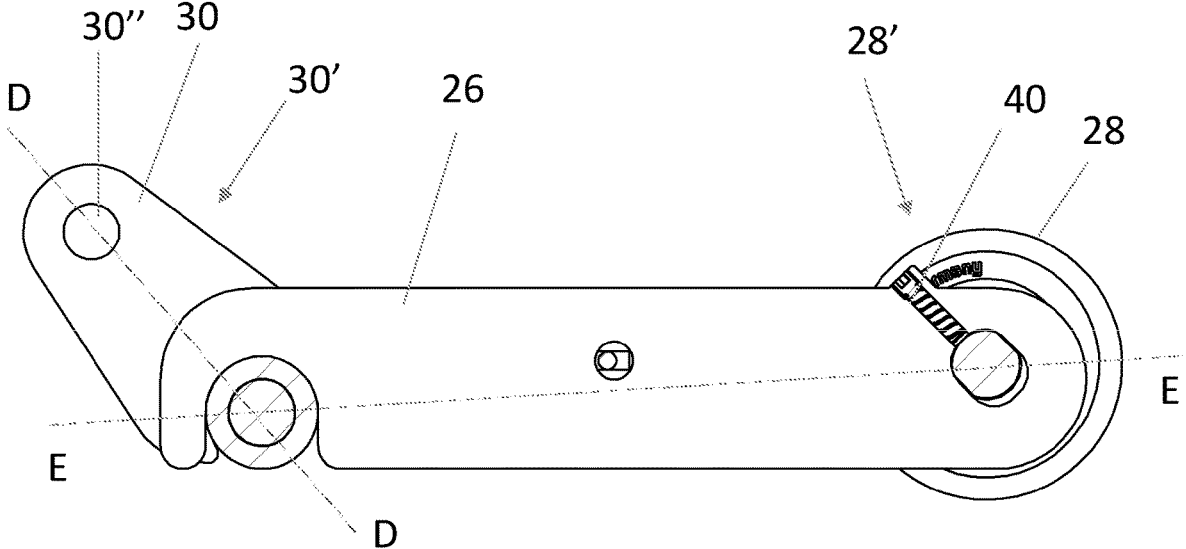
FIG. 10 is a sectional side view of the stabilization member, made along the X-X trace of FIG. 9.

FIG. 9 illustrates an embodiment of the proximity or contact sensor 33 described in the previous paragraphs. In particular, each roller 27, 28 of the stabilization arm 6 is rotatably engaged to at least one corresponding slot guide, clearly visible in the attached FIGS. 7 and FIG. 10.

More in detail, each roller 27, 28 comprises at least one pin housed inside a corresponding said slot guide 31 defined by the respective branch 25, 26.

The slot 31 is elongated in a circumferential direction with respect to the rotation axis A and, advantageously, in a radial direction with respect to the second rotation axis B of the rollers 27, 28. The aforementioned proximity sensor is also associated with each roller 27, 28. or contact 33, such as in particular a switch (in accordance with the attached FIGS. 8 and 9) which is switched on the basis of the position of the roller 27, 28 along the slot 31 and is connected in data exchange to the electronic control unit. In this way, each roller 27, 28 defines a respective contact head when the stabilization arm 6 is extracted towards the pavement.

In other words, the contact areas 27', 28' are slidingly engaged, in particular by lateral pins, at least partially inside corresponding said slot guides 31, and can be operated to slide within said slot guides 31 with the stabilization member in extended configuration, with the contact areas 27'28' which intercept the ground and/or a pavement.

In this way, when the contact areas 27', 28' intercept the ground, the pin engaged inside the slotted guides 31 is moved within the latter. This movement of the pin within the slot guide can be detected by the proximity sensor or contact 33, and sends a corresponding signal to the control unit.

Conveniently, the stabilization member 6' includes at least one check spring 40 designed to oppose the movement of the pin of the contact areas 27', 28'.

Operationally, with the stabilization member 6' in the retracted configuration, the check spring 40 keeps the pins distal to the proximity or contact sensor 33, to obviate the risk that the latter detects unwanted movements.

Otherwise, with the stabilization member 6' in the extended configuration and with the contact areas 27', 28' in contact with the ground and/or a pavement, the weight of the stair climber 1 acts on these contact areas and forces movement. of the pins inside the slot guides 31, overcoming the elastic force of the check spring 40.

Advantageously, the stabilization member 6', and in particular at least one branch 25, 26 of the stabilization arm 6 of the stabilization member 6' comprises at least one radial seat, obtained at the second end 25", 26" branch 25, 26 itself, placed in communication with the slot guide 31.

Conveniently, the aforementioned check spring 40 is housed inside the radial seat, which protrudes inside the slot guide 41 to intercept the pin of the contact areas 27', 28' and in particular the pins of the rollers 27, 28 Finally, it is clear that modifications or variations can be made to the stair climber described and illustrated here without thereby departing from the scope of protection of the attached claims.

For example, it is possible to shape the flange 30 so that the action of the actuator 18 is traction to obtain the extraction of the stabilization arm 6 and not thrust, as it happens in the case of FIG. 9.

The invention claimed is:

1. Self-propelled stair climber for goods comprising:

first and second tracks motorized and having an elongated configuration parallel to a straight forward travel direction of the stair climber;

a loading surface implemented to tilt with respect to the tracks around a first transverse axis, perpendicular to the tracks;

an actuated stabilization member movable between an extracted position so that the weight of the stair climber is carried at least in part by the stabilization member and a retracted position in which the stabilization member is not loaded by the weight of the stair climber;

a proximity or support sensor carried by the stabilization member to send a signal of approach or contact with a floor;

an electronic control unit programmed to:

activate the first and second tracks on the basis of the signal when the stabilization member is extracted; and check an inclination of the loading surface so that the inclination is maintained in a predefined angular range with respect to a horizontal direction; and ignore the signal of said proximity or support sensor during a descent-start mode, said stair climber further comprising a hollow support structure to which the loading surface is hinged and connected to the first and second tracks, in which a first actuator is housed to control the inclination of the loading surface and a second actuator to control the stabilization member;

wherein the first and second actuators are arranged so that, when in a retracted configuration, the first and second actuators are flanked by the first and second tracks.

2. The stair climber according to claim 1, wherein the electronic control unit is programmed in an end-of-climb mode so that, while the first and second tracks are operated to ascend along a slope, the stabilization member is extracted on the basis of a signal of said sensor representative of a contact of the stabilization member and the pavement or of a signal representative of a distance less than a predefined threshold between the stabilization member and the floor.

3. The stair climber according to claim 2, further comprising an obstacle detector connected in data exchange to the control unit so that the stabilization member is operated to leave the retracted position and the end-of-climb mode is initialized automatically based on a second signal transmitted by the obstacle detector.

4. The stair climber according to claim 1, wherein the sensor comprises a contact portion movable along a guide and said proximity or support sensor comprises at least one switchable switch when the moving contact moves due to a weight applied by the stair climber.

5. The stair climber according to claim 1, wherein the first and second actuators are arranged so that, when in a retracted configuration, the first and second actuators are entirely housed within a height encumbrance defined by each of said two tracks.

6. The stair climber according to claim 1, wherein the stabilization arm comprises a first and a second branch, each of which carries a respective roller configured to be placed in contact with the flooring with the arm in the extracted configuration.

7. The stair climber according to claim 6, wherein said proximity or support sensor is mechanically fixed to at least one of said first and second branches.

8. The stair climber according to claim 7, wherein said proximity or support sensor is mechanically fixed in proximity to at least said rollers.

9. The stair climber according to claim 6, wherein the contact sensor is configured to detect the contact of said stabilization member with the ground.

10. The stair climber according to claim 6, wherein the proximity sensor can be activated to detect the distance of the stabilization member with the ground before at least one of the rollers comes into contact with said ground.

11. The stair climber according to claim 1, wherein the proximity sensor can be activated with said stabilization member in the retracted configuration and/or in the extracted configuration.

12. The stair climber according to claim 1, wherein the stabilization member is substantially arranged so that, when in a retracted configuration, it is housed within the zone which is laterally delimited between the two tracks in correspondence with a raised section inclined with respect to a main section of said tracks.

13. The stair climber according to claim 1, wherein the actuators are substantially parallel to a longitudinal development direction of said tracks.

14. Self-propelled stair climber for goods comprising:

first and second tracks motorized and having an elongated configuration parallel to a straight forward travel direction of the stair climber;

a loading surface implemented to tilt with respect to the tracks around a first transverse axis, perpendicular to the tracks;

an actuated stabilization member movable between an extracted position so that the weight of the stair climber is carried at least in part by the stabilization member and a retracted position in which the stabilization member is not loaded by the weight of the stair climber;

a proximity or support sensor carried by the stabilization member to send a signal of approach or contact with a floor;

an electronic control unit programmed to:

activate the first and second tracks on the basis of the signal when the stabilization member is extracted; and check an inclination of the loading surface so that the inclination is maintained in a predefined angular range with respect to a horizontal direction;

said stair climber further comprising a hollow support structure to which the loading surface is hinged and connected to the first and second tracks, in which a first actuator is housed to control the inclination of the loading surface and a second actuator to control the stabilization member;

wherein the first and second actuators are arranged so that, when in a retracted configuration, they are flanked by the first and second tracks, wherein the control unit is programmed in a descent-start mode so that the stabilization member is extracted to raise a proximal portion of the tracks, being a distal portion of the tracks facing the descent, and the tracks are operated to descend the descent and such that the stabilization member is brought into the retracted position automatically when a pre-set condition is satisfied or a signal is generated by a sensor, the pre-set condition and/or the signal being representative of a state of the stair climber in which the tracks contact edges of two adjacent steps.

15. The stair climber according to claim 14, wherein said electronic control unit is programmed to ignore the signal of said proximity or contact sensor during the descent-start mode.

16. The stair climber according to claim 14, comprising a further obstacle detector connected in data exchange with the control unit so that the stabilization member is operated to leave the retracted position and the descent-start mode is automatically initialized on the basis of a third signal transmitted by the additional obstacle detector.

17. The stair climber according to claim 16, in which the first and/or second actuator are linear and the stabilization member is hinged to the support structure.

18. The stair climber according to claim 17, wherein the stabilization member is a first type lever having a free end portion to contact the floor and hinged so as to reduce a force applied by the second actuator to the free end portion.

19. The stair climber according to claim 16, wherein said obstacle detector is mechanically mounted in a rear portion of said stair climber and is configured to detect a greater area than said further obstacle detector, mechanically mounted in correspondence with a front portion of said stair climber.

20. Self-propelled stair climber for goods comprising:

first and second tracks motorized and having an elongated configuration parallel to a straight forward travel direction of the stair climber;

a loading surface implemented to tilt with respect to the tracks around a first transverse axis, perpendicular to the tracks;

an actuated stabilization member movable between an extracted position so that the weight of the stair climber is carried at least in part by the stabilization member and a retracted position in which the stabilization member is not loaded by the weight of the stair climber;

a proximity or support sensor carried by the stabilization member to send a signal of approach or contact with a floor;

an electronic control unit programmed to:

activate the first and second tracks on the basis of the signal when the stabilization member is extracted; and check an inclination of the loading surface so that the inclination is maintained in a predefined angular range with respect to a horizontal direction;

said stair climber further comprising a hollow support structure to which the loading surface is hinged and connected to the first and second tracks, in which a first actuator is housed to control the inclination of the loading surface and a second actuator to control the stabilization member;

wherein the first and second actuators are arranged so that, when in a retracted configuration, they are flanked by the first and second tracks, wherein the first and second actuators are arranged so that, when in a retracted configuration, the first and second actuators are parallel to each other and are entirely housed within the zone which is delimited laterally between the two tracks.

\* \* \* \* \*